US008885107B2

(12) United States Patent
Yokokawa et al.

(10) Patent No.: US 8,885,107 B2
(45) Date of Patent: Nov. 11, 2014

(54) SIGNAL PROCESSING DEVICE, SIGNAL PROCESSING METHOD, AND PROGRAM FOR SELECTIVELY PROCESSING A DESIRED BROADCAST SIGNAL FROM A PLURALITY OF RECEIVED BROADCAST SIGNALS

(75) Inventors: Takashi Yokokawa, Kanagawa (JP); Lachlan Bruce Michael, Saitama (JP); Yuken Goto, Tokyo (JP); Kenichi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/002,996

(22) PCT Filed: Mar. 1, 2012

(86) PCT No.: PCT/JP2012/055235
§ 371 (c)(1),
(2), (4) Date: Sep. 10, 2013

(87) PCT Pub. No.: WO2012/124495
PCT Pub. Date: Sep. 20, 2012

(65) Prior Publication Data
US 2013/0342764 A1    Dec. 26, 2013

(30) Foreign Application Priority Data

Mar. 11, 2011   (JP) ................................ 2011-054390

(51) Int. Cl.
| | | |
|---|---|---|
| *H04N 5/455* | (2006.01) | |
| *H03L 9/00* | (2006.01) | |
| *H04N 7/26* | (2006.01) | |
| *H04N 21/438* | (2011.01) | |
| *H04N 21/61* | (2011.01) | |
| *H04L 29/06* | (2006.01) | |

(52) U.S. Cl.
CPC ........... *H04N 5/455* (2013.01); *H04N 21/4382* (2013.01); *H04N 21/6112* (2013.01); *H04L 65/00* (2013.01)
USPC ............................ 348/726; 375/340; 370/487

(58) Field of Classification Search
CPC ....... H04N 5/44; H04N 5/4401; H04N 5/455; H04L 25/067; H04L 12/2424; H04L 27/2649; H04L 27/2647; H04L 27/01; H04L 25/03006; H04L 25/03159
USPC .......... 348/725, 726, 554, 555, 558; 370/343, 370/484–487, 469, 474; 375/316, 338, 340
See application file for complete search history.

(56) References Cited

U.S. PATENT DOCUMENTS 6,633,753 B1 * 10/2003 Kido .......................... 455/343.2
2006/0056530 A1 * 3/2006 Nakao ........................... 375/260

(Continued)

FOREIGN PATENT DOCUMENTS

WO   WO 2006/028036 A1   3/2006

OTHER PUBLICATIONS

International Search Report issued May 15, 2012 in PCT/JP2012/055235.

(Continued)

*Primary Examiner* — Victor Kostak
(74) *Attorney, Agent, or Firm* — Oblon, Spivak, McClelland, Maier & Neustadt, L.L.P.

(57) ABSTRACT

The present technology relates to a signal processing device, a signal processing method, and a program capable of appropriately demodulating a desired signal from a multiplexed signal obtained by multiplexing a plurality of signals. A preamble signal is detected from a multiplexed signal obtained by multiplexing a plurality of signals. When information for discriminating each of the signals that is contained in the preamble signal indicates a first signal, demodulation by a demodulator is continued and the first signal is demodulated. When information for discriminating each of the signals that is contained in the preamble signal indicates a second signal, demodulation is not performed by stopping the demodulation by the demodulator. The present technology can be applied to a signal processing device that processes signals for digital broadcasting.

4 Claims, 11 Drawing Sheets

(56) References Cited

U.S. PATENT DOCUMENTS

2006/0128309 A1* 6/2006 Dateki et al. ................. 455/41.3
2006/0146943 A1* 7/2006 Kasher et al. ................. 375/260
2006/0234729 A1* 10/2006 Murakami et al. ............ 455/462
2008/0056306 A1* 3/2008 Boontor ........................ 370/503
2009/0304127 A1* 12/2009 Massam et al. ............... 375/343
2010/0091673 A1* 4/2010 Sawai et al. ................... 370/252
2010/0202390 A1* 8/2010 Lim et al. ...................... 370/329
2012/0151547 A1* 6/2012 Mourad et al. ................ 725/116

OTHER PUBLICATIONS

DVB BlueBook A122, Digital Video Broadcasting, Frame structure channel coding and modulation for a second generation digital terrestrial television broadcasting system (DVB-T2), 2008, 158 pages.

* cited by examiner

|  | S1 | S2 | RECEIVED SIGNAL |
|---|---|---|---|
| PATTERN a | T2 | Not mixed | Pure T2 |
| PATTERN b | T2 | Mixed | T2 WITH FEF (P1 OF T2 IS RECEIVED) |
| PATTERN c | Not T2 | Not mixed | Not T2 |
| PATTERN d | Not T2 | Mixed | T2 WITH FEF (P1 OF FEF IS RECEIVED) |

SIGNAL PROCESSING DEVICE, SIGNAL PROCESSING METHOD, AND PROGRAM FOR SELECTIVELY PROCESSING A DESIRED BROADCAST SIGNAL FROM A PLURALITY OF RECEIVED BROADCAST SIGNALS

TECHNICAL FIELD

The present technology relates to a signal processing device, a signal processing method, and a program therefor. More specifically, the present technology relates to a signal processing device, a signal processing method, and a program therefor capable of selectively processing a desired broadcast signal from various broadcast signals that are multiplexed and transmitted.

BACKGROUND ART

In recent years, a modulation method called orthogonal frequency division multiplexing (OFDM) is employed as a method for transmitting digital signals. The OFDM method is a method of providing a large number of orthogonal subcarriers in a transmission band, allocating data to amplitudes and phases of the respective subcarriers, and digitally modulating a signal according to the PSK (phase shift keying) and the QAM (quadrature amplitude modulation).

The OFDM method is often applied to the terrestrial digital broadcasting that is intensely affected by multipath interference. Examples of the digital terrestrial broadcasting employing the OFDM method include standards such as the DVB-T (digital video broadcasting-terrestrial) and the ISDB-T (integrated services digital broadcasting-terrestrial).

In the meantime, the DVB (digital video broadcasting)-T.2 is being established as a standard for next-generation digital terrestrial broadcasting by the ETSI (European Telecommunication Standard Institute) (see Non-Patent Document 1).

CITATION LIST

Non-Patent Document

Non-Patent Document 1: DVB BlueBook A122 Rev.1, Frame structure channel coding and modulation for a second generation digital terrestrial television broadcasting system (DVB-T2), Sep. 1, 2008, DVB homepage (retrieved on Mar. 3, 2011), Internet <URL: http://www.dvb.org/technology/standards/>

SUMMARY OF THE INVENTION

Problems to be Solved by the Invention

According to the DVB-T2 standard, frames called T2-frames are transmitted, and it is defined that frames called FEFs (future extension frames) are time-multiplexed and transmitted between the T2-frames.

At a reception device, it is necessary to determine whether a received frame to be processed is a T2-frame or an FEF and perform corresponding processing. Development and production of a processor dedicated to processing T2-frames and those of a processor dedicated to processing FEFs independent of each other will result in high cost. Furthermore, a device including such two processors will have a large circuit size and a large power consumption.

The present technology has been made in view of the aforementioned circumstances and allows signals obtained by multiplexing different types of frames to be processed by the same processing.

Solutions to Problems

A signal processing device according to one aspect of the present technology includes: a detector configured to detect a preamble signal from a multiplexed signal obtained by multiplexing a plurality of signals; a demodulator configured to demodulate a predetermined signal from the multiplexed signal; and a controller configured to continue demodulation by the demodulator when discrimination information for discriminating each of the signals that is contained in the preamble signal detected by the detector indicates a first signal, and to stop demodulation by the demodulator when the discrimination information indicates a second signal.

A changing unit may further be provided, the changing unit configured to change interpretation of the first signal to interpretation as the second signal when the signal is interpreted as the first signal on the basis of the discrimination information and to change interpretation of the second signal to interpretation as the first signal when the signal is interpreted as the second signal on the basis of the discrimination information, in a setting in which the second signal is to be modulated, and the controller may control the demodulation to continue or to stop on the basis of the interpretation changed by the changing unit.

The first signal may be a signal according to a DVB-T2 standard, and the second signal may be a signal according to a DVB-NGH standard.

A signal processing method or a program according to one aspect of the present technology includes: detecting a preamble signal from a multiplexed signal obtained by multiplexing a plurality of signals; continuing demodulation of a first signal when discrimination information for discriminating each of the signals that is contained in the detected preamble signal indicates the first signal; and stopping demodulation when the discrimination information indicates a second signal.

With the signal processing device, the signal processing method, and the program according to one aspect of the present technology, discrimination information for discriminating each of a plurality of signals from a multiplexed signal obtained by multiplexing the signals is detected, and demodulation of the first signal is continued when the discrimination information indicates a first signal while demodulation is stopped when the discrimination information indicates a second signal.

Effects of the Invention

According to one aspect of the present technology, a desired signal among signals obtained by multiplexing different types of frames can be appropriately processed.

MODES FOR CARRYING OUT THE INVENTION

Embodiments of the present technology will be described below with reference to the drawings.

[Structure of Reception Device]

Figure 1:
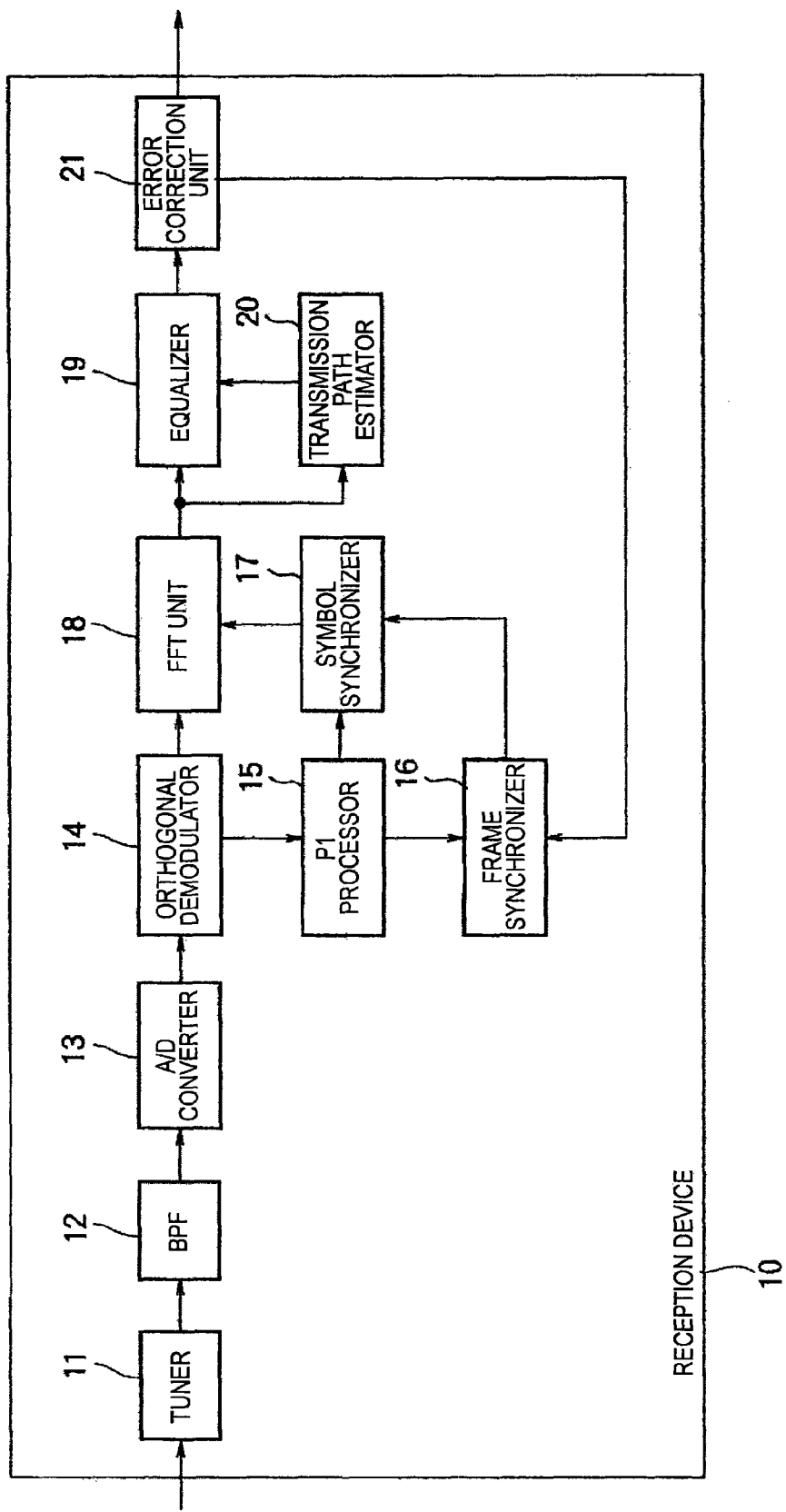
FIG. 1 is a diagram showing a structure of an embodiment of a reception device.

The present embodiment can be applied to a signal processing device configured to process multiplexed signals, and a reception device will thus be described herein as an example of the signal processing device. FIG. 1 is a diagram showing a structure of an embodiment of a reception device configured to receive OFDM (orthogonal frequency division multiplexing) signals. The reception device 10 shown in FIG. 1 is also a device configured to receive and process broadcast signals according to the DVB-T (digital video broadcasting-terrestrial) 2 standard.

The reception device 10 shown in FIG. 1 has a structure including a tuner 11, a BPF (band-pass filter) 12, an A/D (analog-to-digital) converter 13, an orthogonal demodulator 14, a P1 processor 15, a frame synchronizer 16, a symbol synchronizer 17, an FFT (fast Fourier transform) unit 18, an equalizer 19, a transmission path estimator 20, and an error correction unit 21.

An antenna (now shown) connected to the reception device 10 receives a broadcast wave of an OFDM signal transmitted (broadcast) from a transmitting device at a broadcast station, converts the broadcast wave into an RF (radio frequency) signal, and supplies the RF signal to the tuner 11. The tuner 11 extracts signal components in a predetermined frequency band from the RF signal from the antenna, converts the frequency to obtain an IF (intermediate frequency) signal, and supplies the IF signal to the BPF 12.

The BPF 12 filters the IF signal from the tuner 11, and supplies the resulting signal to the A/D converter 13. The A/D converter 13 performs A/D conversion on the IF signal from the BPF 12, and supplies the resulting IF signal that is a digital signal to the orthogonal demodulator 14. The orthogonal demodulator 14 performs orthogonal demodulation on the IF signal from the A/D converter 13 by using a carrier having a predetermined frequency (carrier frequency), and outputs the resulting baseband OFDM signal. Note that the OFDM signal output by the orthogonal demodulator 14 is a signal in the time domain before FFT computation is performed (immediately after IFFT computation is performed on a transmission symbol on an IQ constellation at a transmission device), which may hereinafter also be referred to as an OFDM time domain signal.

The OFDM time domain signal is a complex signal expressed by a complex number having a real axis component (I (in phase) component) and an imaginary axis component (Q (quadrature phase) component). The OFDM time domain signal is supplied from the orthogonal demodulator 14 to the P1 processor 15 and the FFT unit 18. Alternatively, a structure in which a unit configured to correct an offset is provided so that correction of a sampling offset (deviation in sampling timing) at the A/D converter 13 and/or correction of a carrier frequency offset (deviation from the carrier frequency used at the transmission device) at the orthogonal demodulator 14 are performed on the OFDM time domain signal from the orthogonal demodulator 14 may be used.

The P1 processor 15 detects a preamble signal P1 contained in a T2-frame (hereinafter also written as a T2 frame) from the OFDM time domain signal, and calculates position information of P1. The frame synchronizer 16 receives information on S1 and S2 processed by the P1 processor 15 and information on P2 from the error correction unit 21 that are supplied thereto. The frame synchronizer 16 discriminates whether the frame to be processed is a T2-frame or an FEF (future extension frame) from the supplied information, and issues a demodulation stop flag indicating whether or not to continue a demodulation process. Note that the T2 frame, the FEF, P1, P2, S1 and S2 will be described later with reference to FIG. 2.

The symbol synchronizer 17 receives the position information of P1 from the P1 processor 15 and the demodulation stop flag from the frame synchronizer 16 that are supplied thereto. Unless demodulation is stopped by the demodulation stop flag, that is, when demodulation is to be performed, the symbol synchronizer 17 finds the beginning of an effective symbol of P2 on the basis of the detected position of P1 and calculates an FFT Window trigger indicating timing at which computation of the FFT is to be started.

The FFT unit 18 performs FFT computation on the OFDM time domain signal supplied from the orthogonal demodulator 14 according to the FFT Window trigger supplied from the symbol synchronizer 17. As a result of the FFT computation of the OFDM time domain signal, data transmitted on a subcarrier, that is, an OFDM signal representing a transmission symbol on an IQ constellation can be obtained. Note that the OFDM signal obtained by the FFT computation of the OFDM time domain signal is a signal in the frequency domain and will hereinafter also be referred to as an OFDM frequency domain signal.

The FFT unit 18 supplies the OFDM frequency domain signal obtained by the FFT computation to the equalizer 19 and the transmission path estimator 20. The transmission path estimator 20 estimates a transmission path characteristic for each subcarrier (transmission symbol) of the OFDM signal by using a pilot signal arranged at a predetermined position in the OFDM frequency domain signal from the FFT unit 18. The transmission path estimator 20 then supplies transmission path characteristic data that are estimated values of the transmission path characteristics to the equalizer 19.

The equalizer 19 performs distortion correction on the OFDM frequency domain signal from the FFT unit 18 to correct distortion in the amplitudes and the phases of the subcarriers of the OFDM signal caused on the transmission path by using the transmission path characteristic data from the transmission path estimator 20. For example, distortion of the OFDM frequency domain signal is corrected by performing such processing as dividing the OFDM frequency domain signal by the transmission path characteristic data. The equalizer 19 the supplies the OFDM frequency domain signal subjected to distortion correction to the error correction unit 21.

The error correction unit 21 performs a necessary error correction process such as deinterleaving, de-puncturing, Viterbi decoding, spread signal removal, LDPC (low density parity check) decoding, or RS (Reed-Solomon) decoding on the OFDM frequency domain signal from the equalizer 19, and outputs the resulting decoded data to a subsequent component that is not shown.

In the reception device 10 having such a structure, the frame synchronizer 16 serves as a controller configured to issue a flag for performing such control as to continue or to stop demodulation. Furthermore, the frame synchronizer 16 receives discrimination information (S1 and S2) for discriminating a signal to be processed from the P1 processor 15 to issue a flag. A demodulating unit configured to continue or stop demodulation on the basis of the control of the frame synchronizer 16 includes the symbol synchronizer 17, the FFT unit 18, the equalizer 19, the transmission degree estimator 20, and the error correction unit 21.

[Frames]

Next, frames that are received and processed by the reception device 10, in other words, a signal that is generated and transmitted by the transmission device will be described with reference to FIG. 2. In the DVB-T2, data is transmitted in units of transmission frames called T2 frames. Furthermore, in the DVB-T2, a signal called FEF having a structure different from that of a T2 frame is time-multiplexed with the T2 frames, and the resulting signal is transmitted and received.

In the DVB-T2, T2 frames (represented by T2-frame in FIG. 2) and FEFs are multiplexed to be transmitted. Specifically, an FEF is multiplexed with T2 frames at regular intervals (FEF intervals) each containing a plurality of T2 frames and having a predetermined length (FEF length) to be transmitted and received.

The T2 frames and the FEFs each have P1. A T2 frame also has P2, and P1 and P2 constitute a preamble signal that contains information necessary for processing such as demodulation of an OFDM signal.

In P1, discrimination information for discriminating whether the frame is a T2 frame or an FEF is signaled. Accordingly, a reception device that receives a T2 frame and a reception device that receives an FEF can extract and demodulate the T2 frame and the FEF by acquiring information contained in P1.

Furthermore, if the frame is a T2 frame, information necessary for a demodulation process such as an FFT size (the number of samples (symbols) to be subjected to one FFT computation) for performing FFT computation on symbols other than P1 is further signaled in P1. Thus, since P1 contains the transmission technique, the FFT size and the like necessary for demodulation of P2 if the frame is a T2 frame, P1 needs to be demodulated for demodulation of P2.

Following the P1 symbol, a T2 frame further has the P2 symbol, a symbol called Normal, and a symbol called FC (flame closing) in this order.

Figures 3, 4:
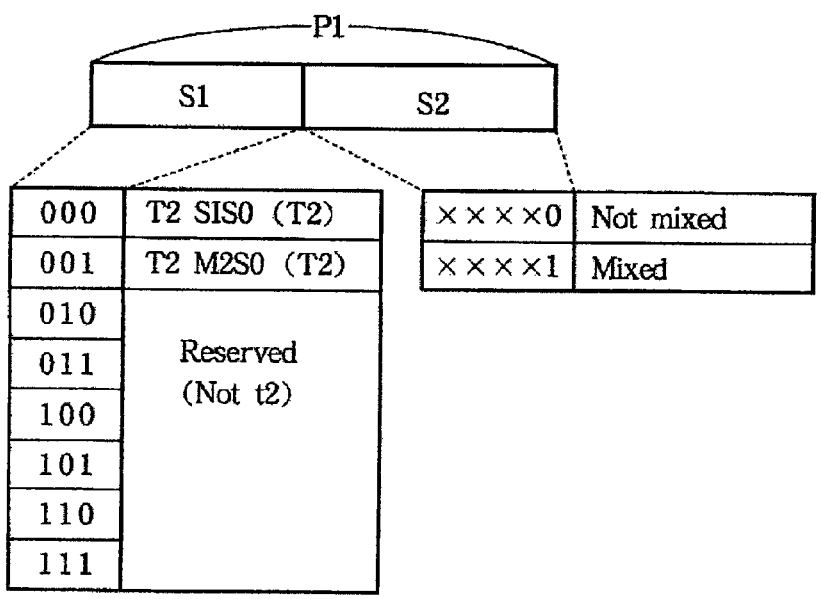
FIG. 3 is a diagram for explaining a preamble signal.
FIG. 4 is a table for explaining patterns that can be read from the preamble signal.

S1 and S2 contained in P1 will be described with reference to FIG. 3. P1 is composed of seven bits. P1 is constituted by S1 and S2, in which S1 is composed of three bits and S2 is composed of four bits. Since S1 is composed of three bits, the possible values of S1 are "000", "001", "010", "011", "100", "101", "110" and "111".

If S1 is "000", this means that the frame is a T2 SISO (single input single output), which is a T2 frame. If S1 is "001", this means that the frame is a T2 MISO (multiple input single output), which is a T2 frame. If S1 is "010", "011", "100", "101", "110", or "111", this is a value whose use is not defined because these values are reserved. If S1 is any of these values, the reception device can at least recognize that the frame is not a T2 frame.

Figure 2:
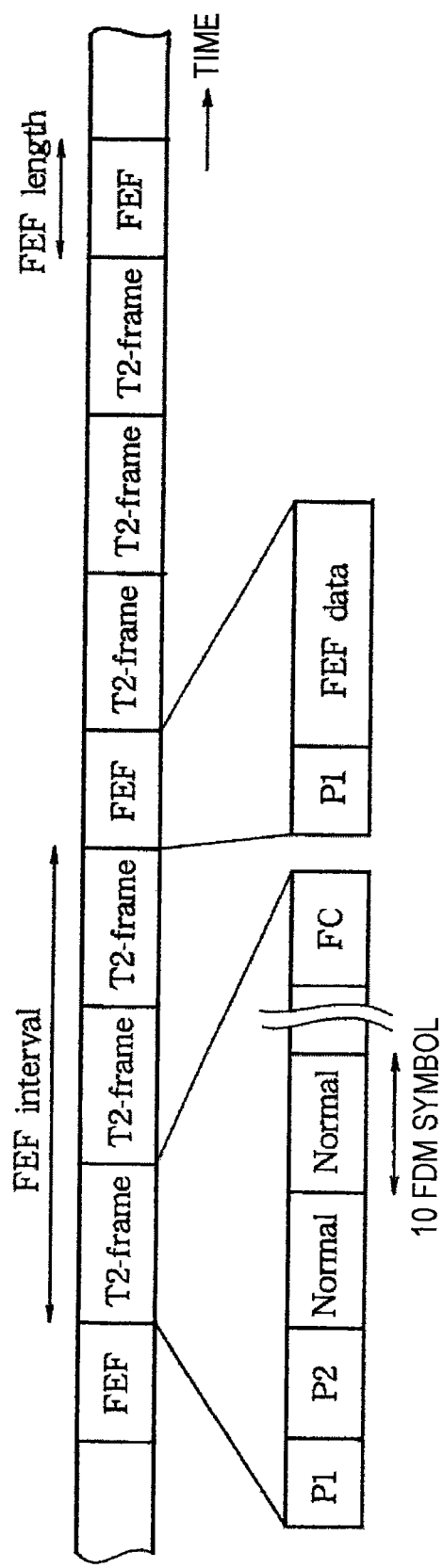
FIG. 2 is a diagram for explaining transmitted/received signals.

For example, when there is a possibility that a signal obtained by multiplexing T2 frames and FEFs as shown in FIG. 2, the reception device can recognize that a frame is a T2 frame if S1 contained in P1 is "000" or "001" or can recognize that the frame is an FEF if P1 has any of the other values by interpreting S1.

S2 contained in P1 is composed of four bits. Since a value indicating the FFT SIZE is written by three bits other than the LSB (least significant bit) out of the four bits, the three bits are represented by "x" in FIG. 3. If the LSB of S2 is "0", this means that the signal being received is "Not Mixed". "Not Mixed" means that the signal contains only T2 frames or only FEFs is not obtained by multiplexing different types of frames.

If the LSB of S2 is "1", this means that the signal being received is "Mixed". "Mixed" means that the signal is a signal obtained by multiplexing different types of frames such as T2 frames and FEFs.

The information as described above is contained in each of S1 and S2. Accordingly, there are patterns of combinations of the information in S1 and S2 as shown in FIG. 4, and it is possible to identify what type of signal (frame) the signal being received is on the basis of each pattern.

A pattern a is a pattern in which the received signal is found to be a T2 frame because S1 is "000" or "001" and in which the signal being received is found to contain no different types of frames (Not Mixed) because S2 is "xxx0". In the pattern a, the received signal is a signal containing only T2 frames (Pure T2), and the reception device 10 performs a process suitable for the pattern a.

A pattern b is a pattern in which the received signal is found to be a T2 frame because S1 is "000" or "001" and in which the signal being received is found to contain different types of frames (Mixed) because S2 is "xxx1". In these circumstances, it is also recognized that the frame to be processed is a T2 frame and that P1 contained in the T2 frame is processed. In the pattern b, the received signal is a signal containing T2 frames and FEF frames (T2 with FEF), and the reception device 10 performs a process suitable for the pattern b.

A pattern c is a pattern in which the received signal is found to be other than a T2 frame (Not T2) because S1 is other than "000" and "001" and in which the signal being received is found to contain no different types of frames (Not Mixed) because S2 is "xxx0". In the pattern c, since the received signal is a signal containing only FEFs (Not T2), the reception device 10 performs a process suitable for the pattern c.

A pattern d is a pattern in which the received signal is found to be other than a T2 frame (Not T2) because S1 is other than "000" and "001" and in which the signal being received is found to contain different types of frames (Mixed) because S2 is "xxx1". In these circumstances, it is also recognized that the frame to be processed is an FEF and that P1 contained in the FEF is processed. In the pattern d, since the received signal is a signal containing T2 frames and FEF frames (T2 with FEF), the reception device 10 performs a process suitable for the pattern d.

In this manner, it is possible to find out the characteristic (patterns a to d) of a received signal by reading P1 that is a preamble signal contained in each of a T2 frame and an FEF. A T2 frame further contains a preamble signal called P2. P2 contains information such as FEF_LENGTH and FEF_INTERVAL as shown in FIG. 2 indicating the FEF interval more accurately and related information called FEF_TYPE. Furthermore, information necessary for demodulation of a T2 frame is also signaled in P2.

The reception device that receives T2 frames is configured to extract and demodulate a T2 frame by acquiring the information on FEFs contained in P1 and P2 and to improve the demodulation performance by eliminating influence of the FEFs.

[Operation of Reception Device]

Figure 5:
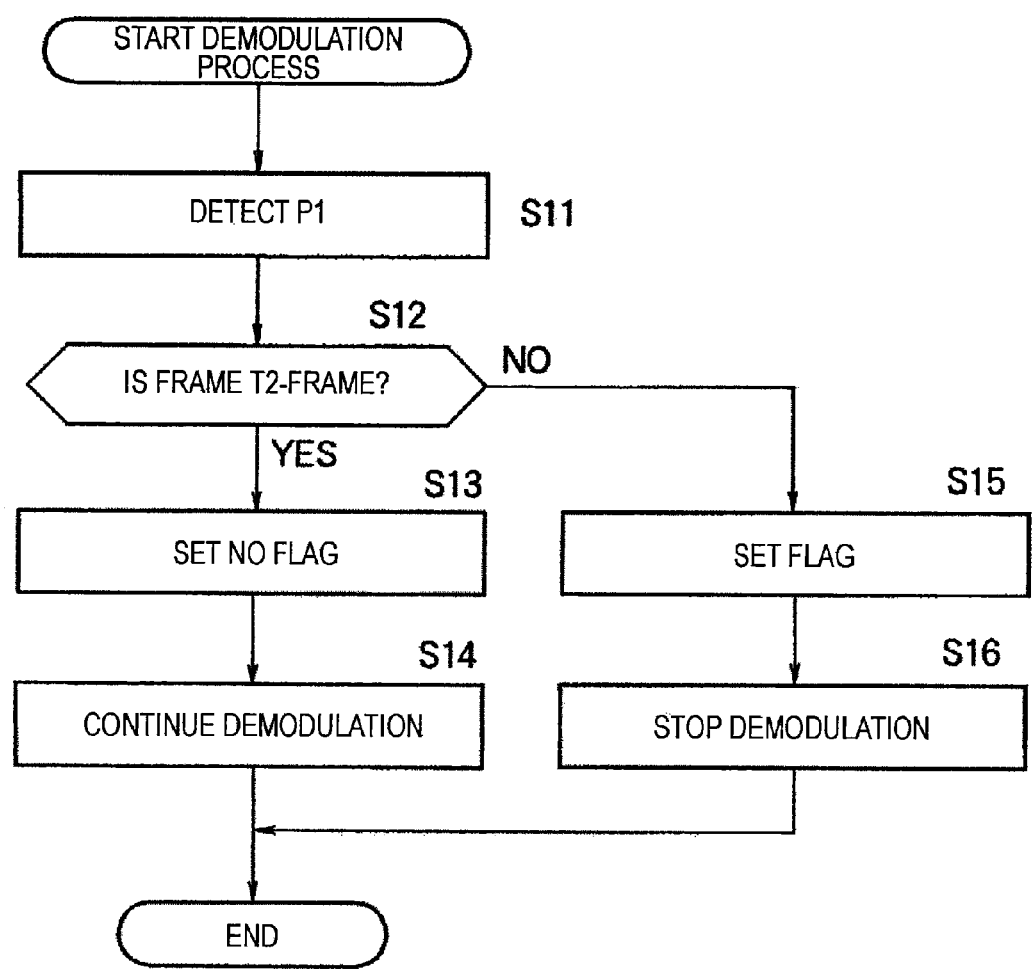
FIG. 5 is a flowchart for explaining operation of the reception device.

Examples of the reception device that receives and processes the signals as shown in FIG. 2 can include a device that processes only T2 frames, a device that processes only FEFs, and a device that processes T2 frames and FEFs. When the reception device 10 shown in FIG. 1 has a structure of a reception device that processes only T2 frames, a process based on the flowchart of FIG. 5 is performed. A process of the reception device 10, in particular, a process relating to demodulation of a T2 frame will be described with reference to the flowchart of FIG. 5.

A signal received by the antenna, subjected to processing by each of the tuner 11 and the BPF 12, and then supplied to the A/D converter 13 is converted to a digital signal and supplied to the orthogonal demodulator 14. Then, the digital signal supplied to the orthogonal demodulator 14 is converted to an OFDM time domain signal and supplied to the P1 processor 15 and the FFT unit 18.

In step S11, the P1 processor 15 detects P1 contained in the OFDM time domain signal. When P1 is detected, the P1 processor 15 further outputs position information of P1 to the symbol synchronizer 17, decodes signaling of S1 and S2 and supplies S1 and S2 to the frame synchronizer 16. In step S12, the frame synchronizer 16 determines whether or not the OFDM time domain signal (frame) to be processed is a T2 frame on the basis of the supplied S1 and S2.

If the signal is determined to be a T2 frame in step S12, the process proceeds to step S13. In step S13, the frame synchronizer 16 does not set the demodulation stop flag. As a result of not setting the demodulation stop flag, the demodulation process is continued in step S14. Specifically, the symbol synchronizer 17 can find the beginning of an effective symbol of P2 from the detected position of P1, and calculates an FFT Window trigger indicating timing at which FFT computation is to be started. Then, the FFT unit 18 performs the FFT on the basis of the FFT Window trigger. Then, processes subsequent to that of the FFT unit 18 are continuously performed sequentially, and the demodulation process on the T2 frame is continued.

In contrast, if the signal is determined not to be a T2 frame in step S12, the process proceeds to step S15. In step S15, the frame synchronizer 16 sets the demodulation stop flag. As a result of setting the demodulation stop flag, the demodulation process is stopped in step S16. Specifically, when an FEF is processed, the demodulation stop flag is set and the demodulation process is to be stopped.

Although the symbol synchronizer 17 is configured to calculate the FFT Window trigger indicating timing at which FFT computation is to be started, the symbol synchronizer 17 stops the calculation when the demodulation stop flag from the frame synchronizer 16 is set. As a result of not calculating the FFT Window trigger by the symbol synchronizer 17, the processes subsequent to that of the FFT unit 18 are also stopped.

As described above, the reception device 10 that processes T2 frames is configured to stop the process of demodulation during the intervals during which FEFs are received. The frame synchronizer 16 can determine which of the patterns a to d described with reference to FIG. 4 the signal corresponds to on the basis of the information of S1 and S2. With this feature, it may be determined which of the patterns a to d the signal corresponds to in step S12 and the processing subsequent to step S12 may be performed on the basis of the determination, for example.

Since a T2 frame or an FEF may be received when the signal is determined to correspond to the pattern b or the pattern d, the processing for determining whether the frame is a T2 frame or an FEF, that is, the processing in step S12 described above may be performed only when the signal is determined to correspond to the pattern b or the pattern d, for example.

Alternatively, the process flow may be such that, when the signal is determined to correspond to the pattern a, the state in which the demodulation stop flag is not set is maintained since it is found that only T2 frames will be received, and when the signal is determined to correspond to the pattern c, the state in which the demodulation stop flag is set is maintained so that the state in which demodulation is stopped will be maintained since it is found that only FEFs will be received, for example.

When the process is performed on the basis of the flowchart shown in FIG. 5, if the frame is determined to be a T2 frame in step S12, the process of demodulation is continued in step S14. As a result of the demodulation process being continued, P2 will be demodulated by the error correction unit 21, and information written in the demodulated P2 will be supplied to the frame synchronizer 16. The information written in P2 is FEF_LENGTH and FEF_INTERVAL, for example. Since the information such as FEF_LENGTH and FEF_INTERVAL can be acquired, the FEF intervals can be recognized more accurately.

As a result of accurately recognizing the FEF intervals, the frame synchronizer 16 can accurately recognize the intervals during which the demodulation stop flag is set and accurately stop demodulation during the FEF intervals. As a result of accurately recognizing the FEF intervals and stopping demodulation during the intervals, it is possible to eliminate the influence of the FEF intervals on demodulation of T2 frames. As a result, the demodulation performance of T2 frames can be improved.

[DVB-NGH]

The FEFs described above can be transmitted in a form in which the T2 frames and the FEFs are multiplexed as described with reference to FIG. 2. In the meantime, the DVB-NGH standard is being established as a standard different from the DVB-T2. In the DVB-NGH standard, a system compliant to and compatible with the DVB-T2 is considered. Furthermore, it is proposed that frames according to the DVB-NGH (hereinafter may also be referred to as NGH frames as appropriate) be transmitted by using FEFs.

Figure 6:
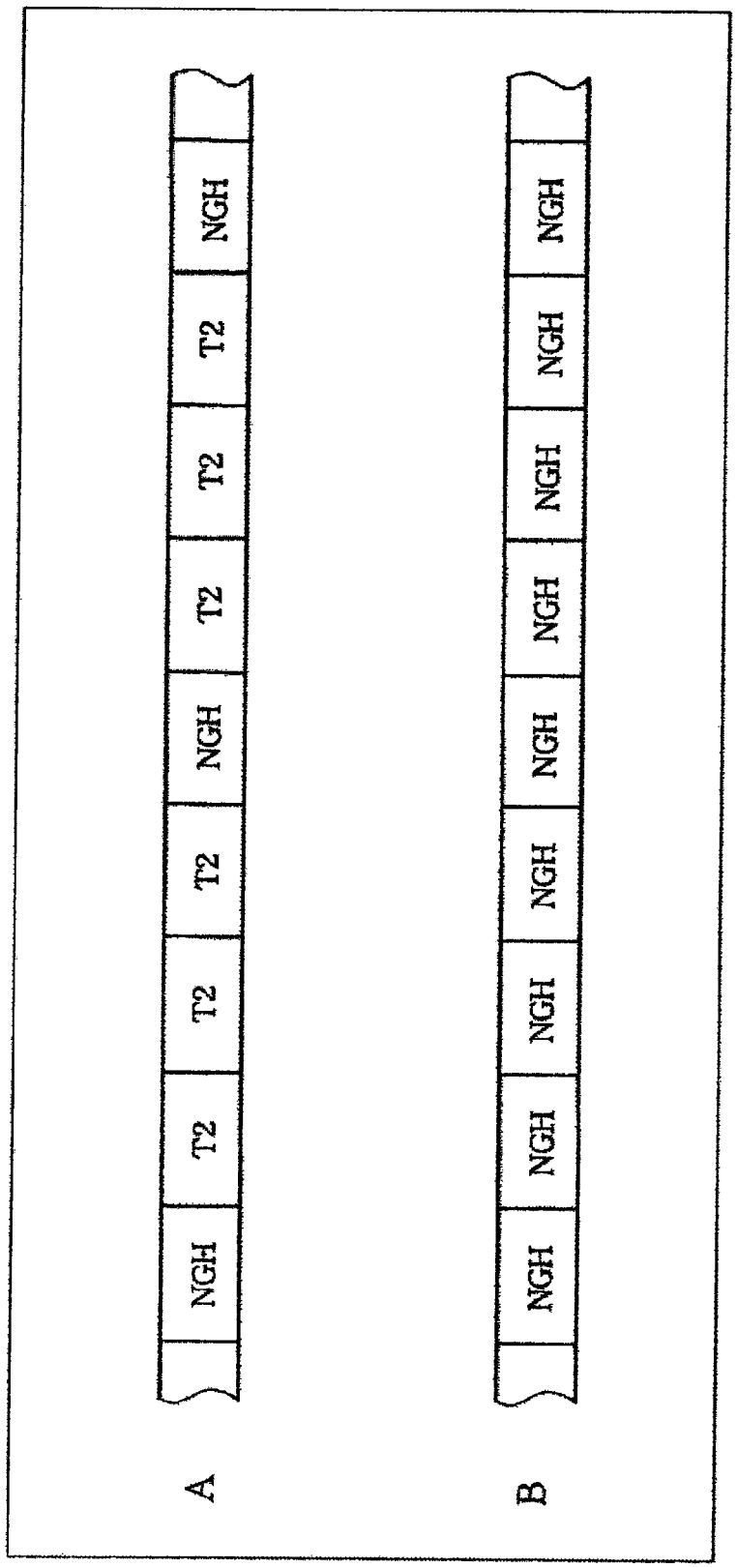
FIG. 6 is a diagram for explaining transmitted/received signals.

A in FIG. 6 shows an example of transmission in which NGH frames are transmitted using FEFs in the DVB-T2. In the example shown in A of FIG. 6, NGH frames and T2 frames are time-multiplexed and transmitted in such a manner that an NGH frame is transmitted, followed by three T2 frames, followed by an NGH frame, followed by three T2 frames.

B in FIG. 6 shows an example of transmission in which NGH frames are transmitted using FEFs in the DVB-T2, but the NGH frames are transmitted alone in this example. The example shown in B of FIG. 6 is an example in which the NGH frames are continuously transmitted.

In this manner, the NGH frames may be multiplexed with T2 frames and then transmitted or may be transmitted alone.

Reference is now made to FIG. 2 again for reference. In FIG. 2, a T2 frame contains P1 and P2 as preamble signals. In contrast, an FEF contains P1 as a preamble signal but does not contain P2. When the signal structures vary in this manner, a processor (referred to as a T2 processor) for processing T2 frames and a processor (referred to as an FEF processor) for processing FEFs are separately designed to be suitable for respective signals to be processed and provided in separate devices. Accordingly, a device capable of selectively processing T2 frames and FEFs has a structure including both the T2 processor and the FEF processor.

On the basis of the above, it is assumed as follows when NGH frames are transmitted in place of FEFs. Examples of the reception device can include a device that processes only T2 frames, a device that processes only NGH frames, and a device selectively processes T2 frames and NGH frames. When the reception device is a device that processes only T2 frames, the reception device includes the T2 processor which processes T2 frames. Similarly, when the reception device is a device that processes only NGH frames, the reception device includes a processor configured to process NGH frames (referred to as an NGH processor). When the reception device is a device that selectively processes T2 frames and NGH frames, the reception device includes the T2 processor and the NGH processor, and performs processing by a processor suitable for a received frame.

Figure 7:
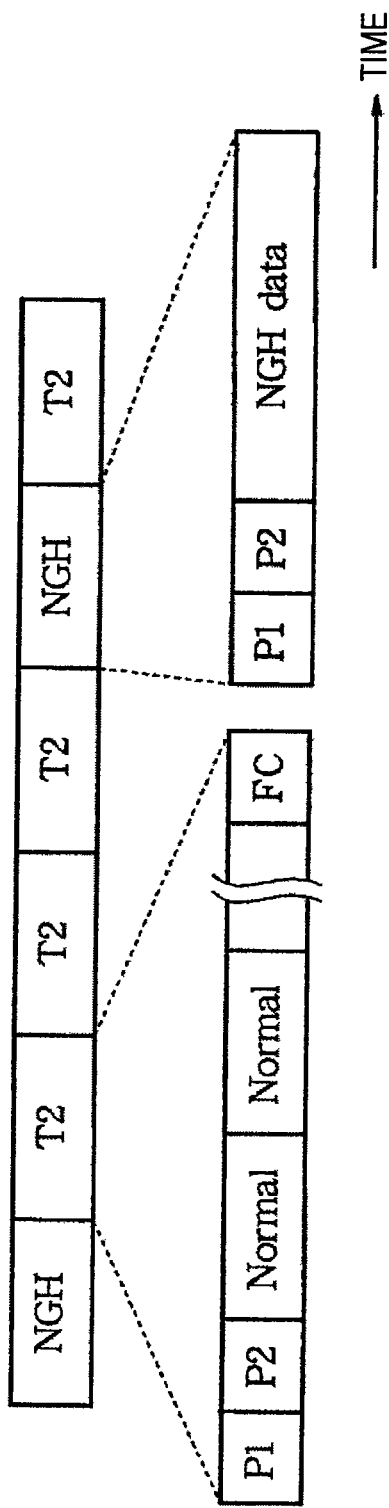
FIG. 7 is a diagram for explaining a preamble signal.

Since the DVB-NGH standard is a technique compliant to and compatible with the DVB-T2 as described above, the structures of signals according to the DVB-NGH are assumed to follow those according to the DVB-T2. In other words, the signal structure of T2 frames and the signal structure of NGH frames are the same. This will be described with reference to FIG. 7. A T2 frame contains P1 and P2 as preamble signals. Similarly, an NGH frame also contains P1 and P2 as preamble signals.

P1 contained in a T2 frame and P1 contained in an NGH frame have different values from each other but describe the same information items. Specifically, as described with reference to FIG. 3, P1 includes S1 and S2, S1 contains information on whether or not the frame is a T2 frame, S2 contains information on whether or not different types of frames are mixed in the signal being received.

Similarly, P2 contained in a T2 frame and P2 contained in an NGH frame have different values from each other but describe the same information items. P2 contains information such as FEF_LENGTH and FEF_INTERVAL in the case of an FEF, and P2 also contains information corresponding to such information in the case of an NGH.

Since a T2 frame and an NGH frame have the same structure in this manner, a process of performing synchronous reproduction/demodulation of T2 frames and a process of performing synchronous reproduction/demodulation of NGH frames are the same. Use of this feature allows a processor in common as the T2 processor and the NGH processor. If the T2 processor and the NGH processor can be realized as one processor, such a processor can be applied to all of a device that processes only T2 frames, a device that processes only NGH frames, and a device that selectively processes T2 frames and NGH frames. As a result, it is possible to prevent the circuit size from increasing and reduce the power consumption.

In the following embodiment, in order to realize the T2 processor and the NGH processor as one processor, interpretation of signaling (S1, S2) of P1 in which information for detecting a T2 frame and an NGH frame is described is changed so that processing is performed by the reception device as if a signal according to the DVB-T2 is being received. Specifically, either of a T2 frame and an NGH frame can be processed by changing interpretation of a T2 frame to an FEF (NGH) and interpretation of an FEF (NGH) to a T2 frame.

[Structure of Reception Device that Processes Frames According to DVB-NGH Standard]

Figure 8:
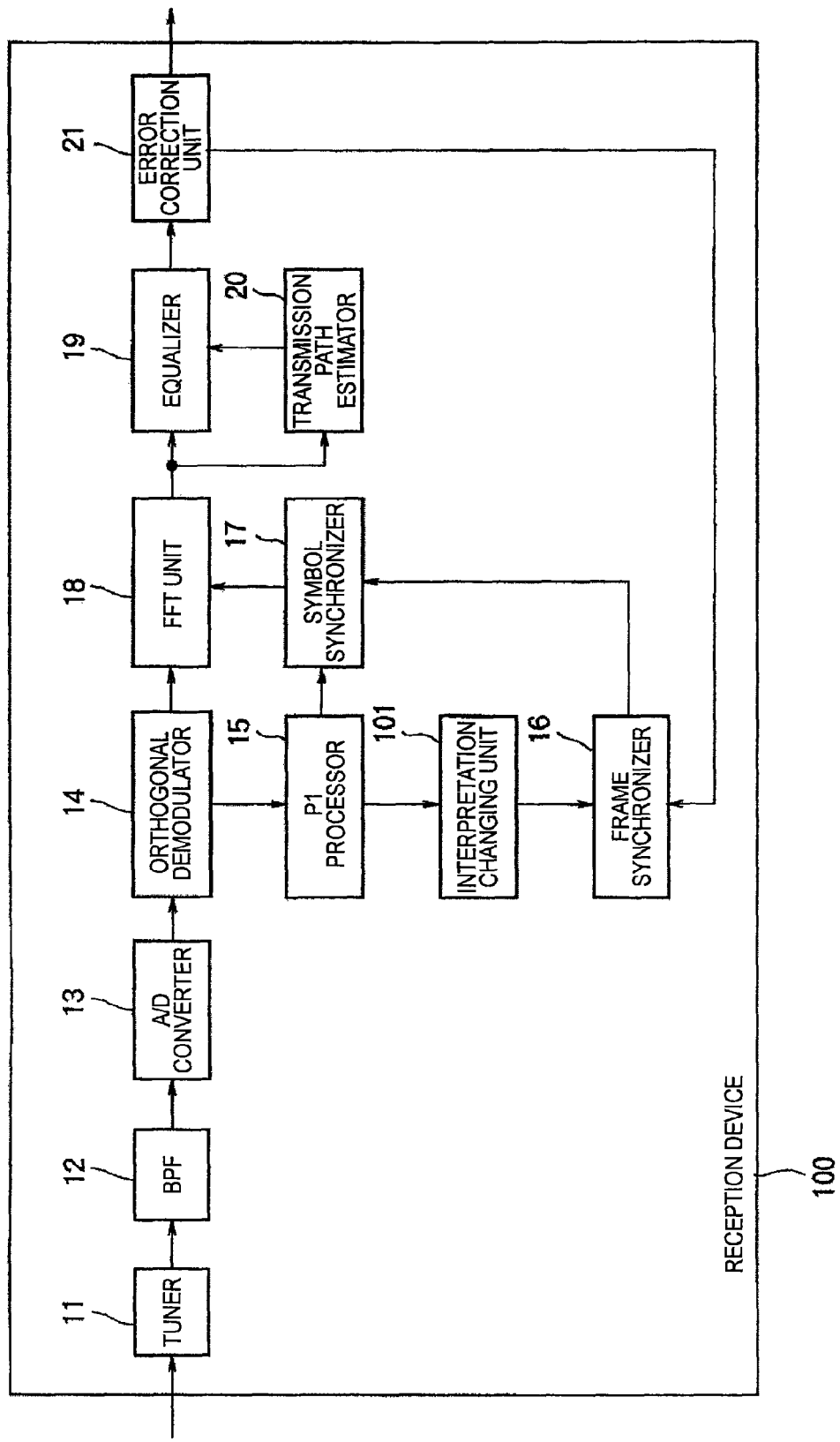
FIG. 8 is a diagram showing a structure of another embodiment of the reception device.

FIG. 8 is a diagram showing a structure of an embodiment of a reception device taking the above into consideration. The reception device 100 shown in FIG. 8 has a structure in which an interpretation changing unit 101 is added to the reception device 10 shown in FIG. 1. In the reception device 10 shown in FIG. 1 and the reception device 100 shown in FIG. 8, components having the same functions will be designated by the same reference numerals and the description thereof will not be repeated.

The interpretation changing unit 101 is provided between the P1 processor 15 and the frame synchronizer 16. The interpretation changing unit 101 acquires information of P1 processed by the P1 processor 15 and determines whether the frame is a T2 frame or an NGH frame. If the frame is determined to be a T2 frame, the interpretation changing unit 101 supplies the information of P1 to the frame synchronizer 16 without changing the interpretation, while if the frame is determined to be an NGH frame, the interpretation changing unit 101 changes the interpretation as will be described later and supplies the information of P1 resulting from the change to the frame synchronizer 16. The frame synchronizer 16 stops/starts/continues demodulation on the basis of the supplied information of P1.

Next, description will be additionally provided on operation of the reception device 100 in each of the cases where the reception device 100 is a device that processes T2 frames, where the reception device 100 is a device that processes NGH frames and where the reception device 100 is a device that selectively processes T2 frames and NGH frames.

[Operation of Reception Device that Processes T2 Frames]

When the reception device 100 is a device that processes T2 frames, the operation thereof will be performed on the basis of the flowchart of FIG. 5. When the reception device 100 is a device that processes T2 frames, the reception device 100 demodulates the T2 frame being received if a T2 frame is being received, or stops demodulation if an NGH frame is being received. Since such operation is the same as the case where demodulation is stopped when an FEF is being received, the processing can be performed on the basis of the flowchart of FIG. 5 described above. It is assumed here that the processing is performed on the basis of the flowchart of FIG. 5, and description will be made without repeating the description of the processing that is already described above as appropriate.

When the reception device 100 is a device that processes T2 frames, the interpretation changing unit 101 is configured to supply the information of P1 from the P1 processor 15 to the frame synchronizer 16 without changing the interpretation. Thus, if a T2 frame is being processed, the frame synchronizer 16 determines that the frame is a T2 frame in step S12 (FIG. 5) and performs processing of not setting the flag in step S13. Accordingly, in this case, demodulation is continued in step S14.

In contrast, if an NGH frame is being processed, the frame synchronizer 16 determines that the frame is not a T2 frame in step S12 (FIG. 5) and sets the flag in step S15. Accordingly, in this case, demodulation is stopped in step S16.

As described above, when the reception device 100 is a device that processes T2 frames, the interpretation changing unit 101 performs processing without changing the interpretation of the supplied information of P1, which allows such a processing as appropriately demodulating a T2 frame and appropriately stopping demodulation for a NGH frame.

[Operation of Reception Device that Processes NGH Frames]

Figure 9:
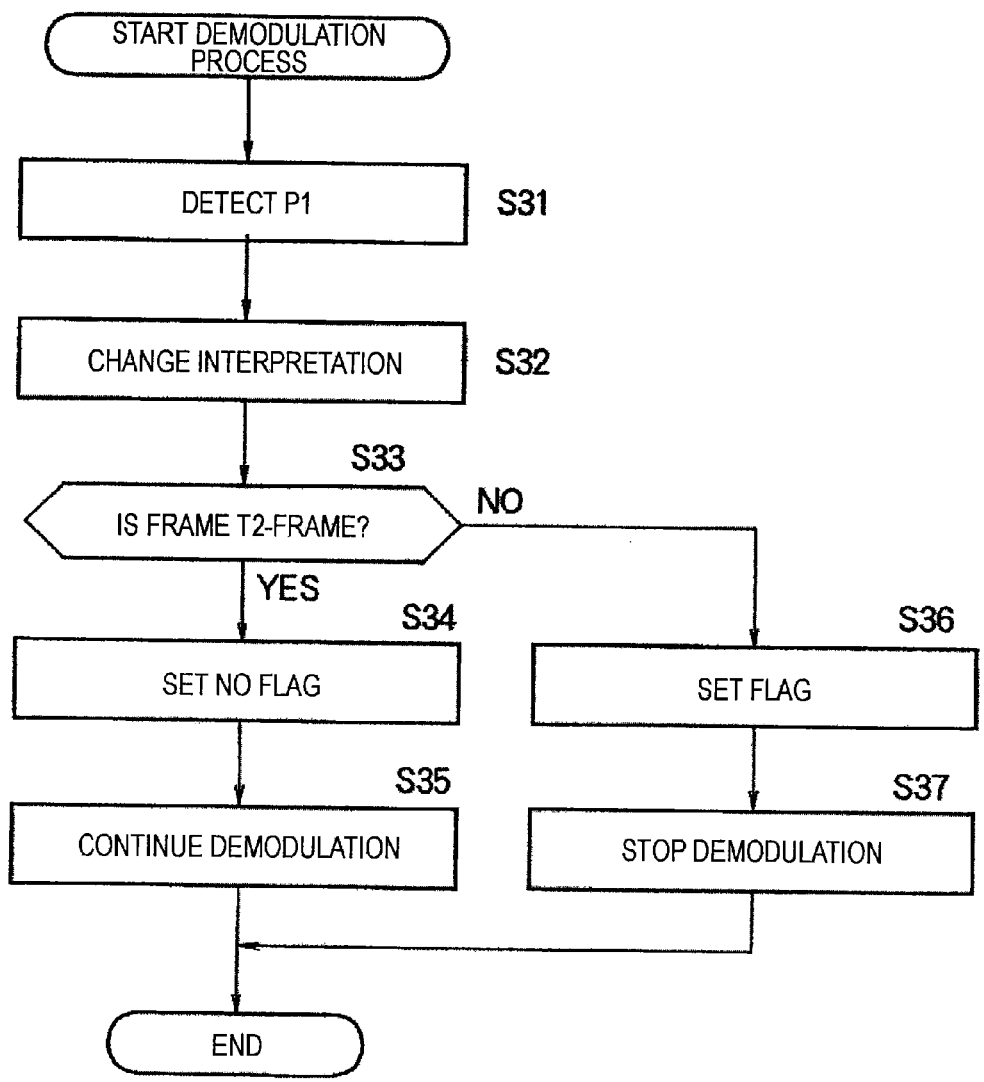
FIG. 9 is a flowchart for explaining operation of the reception device.

Next, when the reception device 100 is a device that processes NGH frames, the operation thereof will be performed on the basis of the flowchart of FIG. 9. When the reception device 100 is a device that processes NGH frames, such processing as demodulating an NGH frame and stopping demodulation for a T2 frame is performed.

In step S31, the P1 processor 15 detects P1 contained in an OFDM time domain signal. When P1 is detected, the P1 processor 15 further outputs position information of P1 to the symbol synchronizer 17, decodes signaling of S1 and S2 and supplies S1 and S2 to the interpretation changing unit 101. In step S32, the interpretation changing unit 101 changes interpretation.

Figure 10:
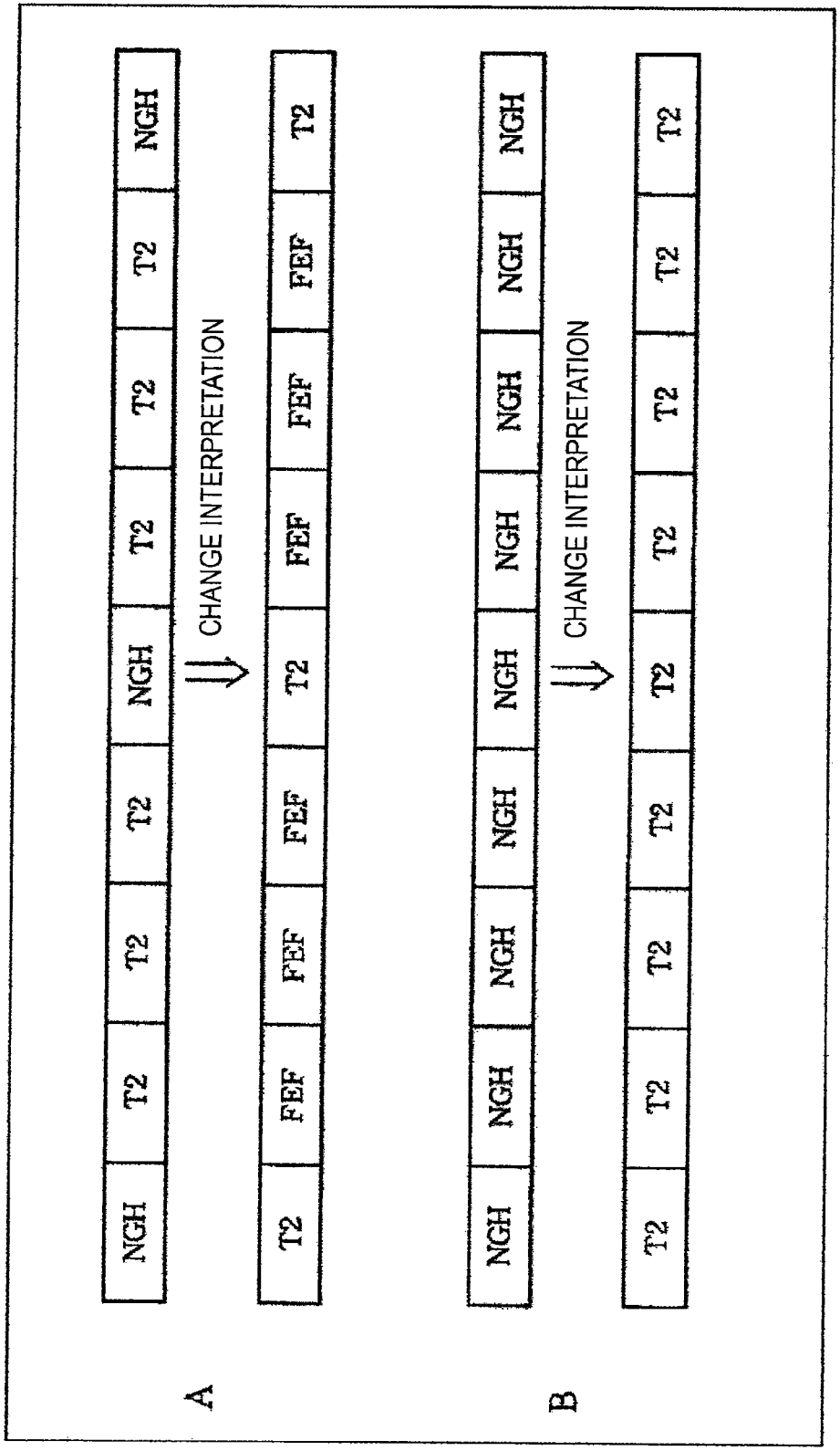
FIG. 10 is a diagram for explaining a change in interpretation.

FIG. 10 shows examples of frames before and after changing the interpretation. The frames shown in the upper part of A in FIG. 10 include frames continuous in such a manner that a NGH frame is followed by three T2 frames, followed by an NGH frame, followed by three T2 frames and so on. If such frames are received, the interpretation changing unit 101 changes the interpretation of an NGH frame to the interpretation of a T2 frame and changes the interpretation of a T2 frame to the interpretation of an FEF.

As a result of such changes, the frames after changing the interpretation will be handled as frames as shown in the lower part of A in FIG. 10. The frames shown in the lower part of A in FIG. 10 include frames continuous in such a manner that a T2 frame is followed by three FEF frames, followed by a T2 frame, followed by three FEF frames and so on.

When such changes are made and when a signal composed only of NGH frames as shown in the upper part of B in FIG. 10, the signal will be processed as a signal composed only of T2 frames as shown in the lower part of B in FIG. 10. Description will be additionally made more specifically.

When an NGH frame is to be processed, the interpretation changing unit 101 changes interpretation of S1 and S2 so that the NGH frame will be processed in the same manner as a T2 frame. For example, when an HGH frame is processed, the interpretation changing unit 101 changes the interpretation of the value of S1, which is a value other than "000" and "001", to the value "000" or "001", for example "000", and outputs the changed interpretation result to the subsequent frame synchronizer 16. As a result of changing the interpretation to the interpretation that the frame is a T2 frame while actually being an NGH frame in this manner by the interpretation changing unit 101, the frame will be handled as a T2 frame while actually being an NGH frame in subsequent processing.

Accordingly, in such a case, the frame is determined to be a T2 frame in step S33 since the change in the interpretation by the interpretation changing unit 101 is performed although an NGH frame is to be processed, and the process proceeds to step S34. In step S34, the frame synchronizer 16 does not set the demodulation stop flag. As a result of not setting the demodulation stop flag, the demodulation process is continued in step S35.

Specifically, the symbol synchronizer 17 can find the beginning of an effective symbol of P2 from the detected position of P1, and calculates an FFT Window trigger indicating timing at which FFT computation is to be started. Then, the FFT unit 18 performs the FFT on the basis of the FFT Window trigger. Then, since processes subsequent to that of the FFT unit 18 are continuously performed sequentially, the demodulation process on the NGH frame that is assumed to be a T2 frame in a pseudo manner is performed.

In contrast, when a T2 frame is to be processed, the interpretation changing unit 101 changes interpretation of S1 and S2 so that the T2 frame will be processed in the same manner as an FEF frame. For example, when a T2 frame is processed, the interpretation changing unit 101 changes the interpretation of the value of S1, which is "000" or "001", to a value other than "000" and "001", for example "010", and outputs the changed interpretation result to the subsequent frame synchronizer 16. As a result of changing the interpretation to the interpretation that the frame is an FEF while actually being a T2 frame in this manner by the interpretation changing unit 101, the frame will be handled as an FEF frame while actually being a T2 frame in subsequent processing.

Accordingly, in such a case, the frame is determined not to be a T2 frame in step S33 since the change in the interpretation by the interpretation changing unit 101 is performed although a T2 frame is to be processed, and the process proceeds to step S36. In step S36, the frame synchronizer 16 sets the demodulation stop flag. As a result of setting the demodulation stop flag, the demodulation process is stopped in step S37.

As a result of changing the interpretation of S1 and S2 contained in P1 that is a preamble signal contained in a T2 frame or an NGH frame by the interpretation changing unit 101 as described above, an NGH frame can be handled as a T2 frame and an NGH frame can be demodulated as a T2 frame. Furthermore, a T2 frame can be handled as an FEF and demodulation can be stopped for a T2 frame.

[Operation of Reception Device That Processes T2 Frames and NGH Frames]

Figure 11:
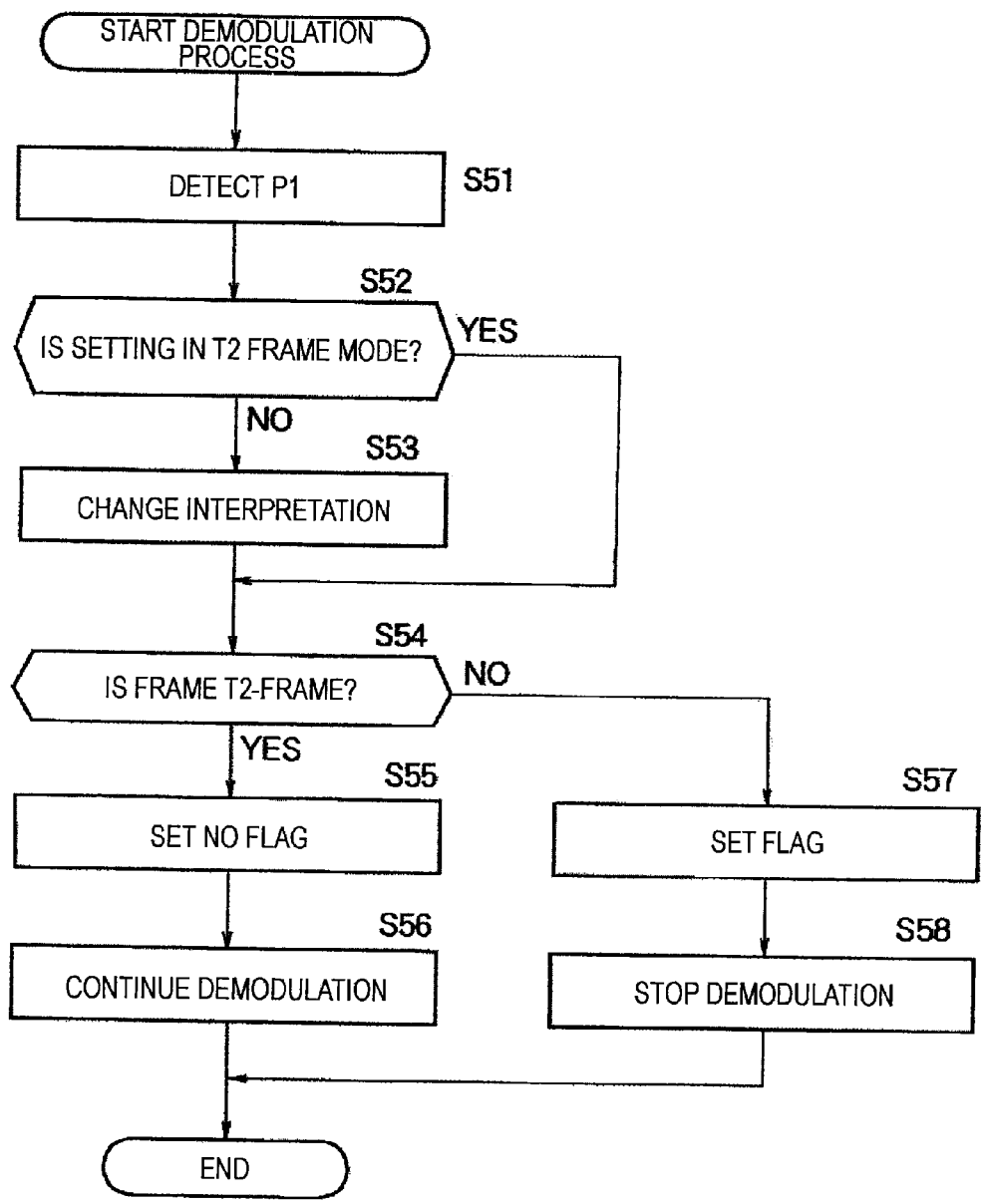
FIG. 11 is a flowchart for explaining operation of the reception device.

Next, when the reception device 100 is a device that selectively processes T2 frames or NGH frames, the operation thereof will be performed on the basis of the flowchart of FIG. 11. Selective processing of a T2 frame or an NGH frame will be described here. For example, a case in which a program provided by using T2 frames and a program provided by using NGH frames are the same program, that is, a case of so-called simulcast is assumed. It is assumed that the program provided by NGH frames is a broadcast program with lower resolution and a smaller data processing amount than the program provided by T2 frames.

In addition, a terminal such as a mobile terminal in which the state of reception of a broadcast program may vary is considered. If such a terminal is a terminal that can process both T2 frames and NGH frames, it is possible to process the T2 frames with higher resolution and provide the program provided by the T2 frames to the user under a good reception state, while processing the NGH frames with lower resolution and providing the program provided by the NGH frames to the user under a bad reception state. In such a terminal, it is determined whether to process the T2 frames or the NGH frames according to the reception state and processing is performed on the basis of the determination. Herein, such a terminal (device) is assumed to be a device that selectively processes T2 frames or NGH frames.

According to such definition, a television receiver installed at home, which can receive a signal continuously under a relatively good reception state, for example, corresponds to a device that processes only T2 frames. Processing performed by a device that processes only T2 frames to which such a television receiver corresponds has been already described.

In contrast, a mobile terminal such as a portable telephone corresponds to a device that processes NGH frames since the mobile terminal is likely to receive signals continuously under a relatively bad reception state. Processing performed by a device that processes only NGH frames to which the mobile terminal and the like correspond has been already described with reference to the flowchart of FIG. 9, etc.

Thus, since the reception device 100 according to the present embodiment can be applied to even different devices such as a television receiver and a mobile terminal, it is not necessary to design and manufacture chips and the like for each of such terminals. Furthermore, as will be described with reference to the flowchart of FIG. 11, the reception device can also be applied to a device that selectively processes T2 frames and NGH frames.

The description refers back to the flowchart of FIG. 11, in which P1 is detected in step S51. The processing in step S51 is performed in the same manner as step S31 (FIG. 9), and the description thereof will therefore not be repeated. In step S52, the interpretation changing unit 101 determines whether or not the setting is in a T2 frame mode. Note that the T2 frame mode herein refers to a mode in which a T2 frame is processed. A mode in which an NGH frame is processed is referred to as an NGH frame mode.

Determination on which of the T2 frame mode and the NGH frame mode is to be set is made according to the signal reception state, by instruction from the user, or the like. When the mode is to be set according to the signal reception state, it is determined whether the signal reception state is good or bad, and the T2 frame mode is set if the reception state is good while the NGH frame mode is set if the reception state is bad.

If it is determined in step S52 that the setting is not in the T2 frame mode, the process proceeds to step S53. In step S53, the interpretation is changed. Specifically, since the process proceeds to step S53 when the NGH frame mode is set, the interpretation changing unit 101 changes the interpretation so that a T2 frame will be handled as an FEF and an NGH frame will be performed as a T2 frame. Since the processing subsequent to step S53 is performed similarly as that subsequent to step S32 in the flowchart of FIG. 9, the description thereof will not be repeated.

In contrast, if it is determined in step S52 that the setting is in the T2 frame mode, the process proceeds to step S54 skipping the processing in step S53. In this case, since the change in the interpretation is not performed by the interpretation changing unit 101, a T2 frame will be handled as a T2 frame and an NGH frame will be handled as an NGH frame (FEF). Since the processing subsequent to step S54 is performed similarly as that subsequent to step S12 in the flowchart of FIG. 5, the description thereof will not be repeated.

In the NGH frame mode, as a result of changing the interpretation of S1 and S2 contained in P1 that is a preamble signal contained in a T2 frame or an NGH frame by the interpretation changing unit 101 as described above, an NGH frame can be handled as a T2 frame. An NGH frame can thus be demodulated as a T2 frame. Furthermore, a T2 frame can be handled as an FEF and demodulation can be stopped for a T2 frame.

In contrast, in the T2 frame mode, since processing can be performed without changing the interpretation of S1 and S2 contained in P1 that is a preamble signal contained in a T2 frame or an NGH frame, an NGH frame can be handled as a T2 frame. A T2 frame can thus be demodulated as a T2 frame. Furthermore, an NGH frame can be handled as an FEF and demodulation can be stopped for an NGH frame.

As described above, according to the present embodiment, signals according to the DVB-NGH can be received and processed in addition to signals according to the DVB-T2. A circuit for processing signals according to the DVB-T2 and a circuit for processing signals according to the DVB-NGH need not be provided separately but a circuit can be used in common therefor, it is possible to prevent the size of circuits for processing two different types of signals from increasing.

Furthermore, according to the present embodiment, when the reception device 100 is made up of chips, a chip that can be used in common even in different devices including a device mainly used in an installed state such as a television receiver and a mobile device such as a portable telephone and a notebook personal computer can be provided as described above.

Although examples in which an analog signal is received has been described above, the structure of each device will be different only in that the A/D converter is excluded and the other components are the same in a case where a digital signal is received.

Furthermore, although examples in which a multiplexed signal obtained by multiplexing T2 frames and FEFs is received and examples in which a multiplexed signal obtained by multiplexing T2 frames and NGH frames is received have been described in the embodiments described above, the scope to which the present technology is applied is not limited to these signals. For example, the present technology can be applied even to a case where a multiplexed signal obtained by multiplexing a plurality of signals having the same structure is to be processed. Furthermore, the number of signals to be multiplexed is not limited to two but may be two or more.

[Recording Medium]

The series of processes described above can be performed either by hardware or by software. When the series of processes described above is performed by software, programs constituting the software are installed in a computer. Note that examples of the computer include a computer embedded in dedicated hardware and a general-purpose personal computer capable of executing various functions by installing various programs therein.

Figure 12:
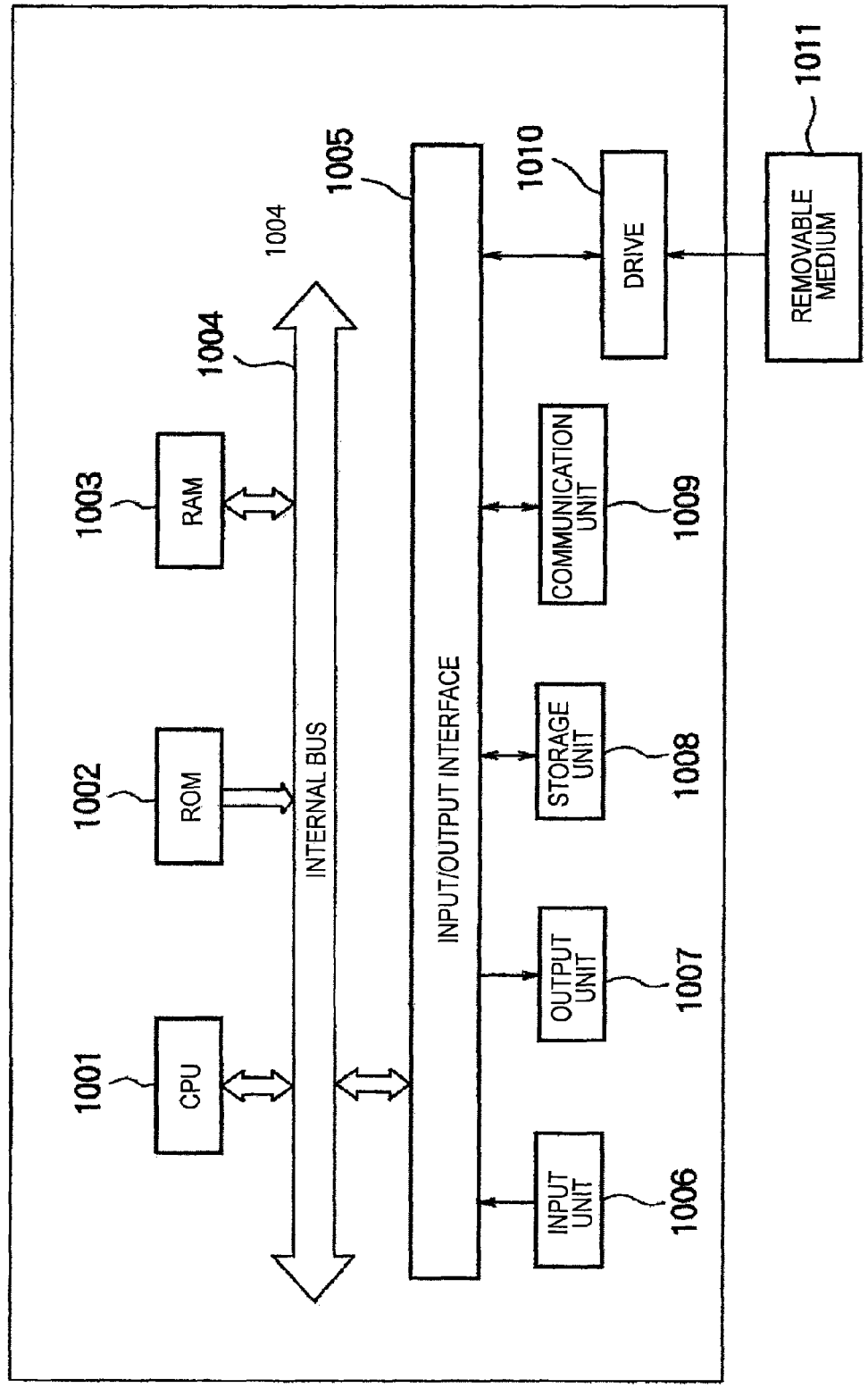
FIG. 12 is a diagram for explaining a recording medium.

FIG. 12 is a block diagram showing an example structure of the hardware of a computer that performs the above described series of operations in accordance with programs. In the computer, a CPU (central processing unit) 1001, a ROM (read only memory) 1002, and a RAM (random access memory) 1003 are connected to one another by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, microphone and the like. The output unit 1007 includes a display, a speaker and the like. The storage unit 1008 may be a hard disk, a nonvolatile memory, or the like. The communication unit 1009 may be a network interface or the like. The drive 1010 drives a removable medium 1011 such as a magnetic disk, an optical disk, a magnetooptical disk, or a semiconductor memory.

In the computer having the above described structure, the CPU 1001 loads a program stored in the storage unit 1008 into the RAM 1003 via the input/output interface 1005 and the bus 1004 and executes the program, so that the above described series of operations are performed.

The programs to be executed by the computer (the CPU 1001) may be recorded on the removable medium 1011 as a package medium or the like and provided therefrom, for example. Alternatively, the programs can be provided via a wired or wireless transmission medium such as a local area network, the Internet, or digital satellite broadcasting.

In the computer, the programs can be installed in the storage unit 1008 via the input/output interface 1005 by mounting the removable media 1011 on the drive 1010. Alternatively, the programs can be received by the communication unit 1009 via a wired or wireless transmission medium and installed in the storage unit 1008. Still alternatively, the programs can be installed in advance in the ROM 1002 or the storage unit 1008.

The programs to be executed by the computer may be programs for carrying out processes in chronological order in accordance with the sequence described in this specification, or programs for carrying out processes in parallel or at necessary timing such as in response to a call.

In this specification, a system refers to the entirety of equipment including more than one device.

Note that embodiments of the present technology are not limited to the embodiments described above, but various modifications may be made thereto without departing from the scope of the technology.

The present technology can also have the following structures.

(1) A signal processing device including: a detector configured to detect a preamble signal from a multiplexed signal obtained by multiplexing a plurality of signals; a demodulator configured to demodulate a predetermined signal from the multiplexed signal; and a controller configured to continue demodulation by the demodulator when discrimination information for discriminating each of the signals that is contained in the preamble signal detected by the detector indicates a first signal, and to stop demodulation by the demodulator when the discrimination information indicates a second signal.

(2) The signal processing device described in (1), further including: a changing unit configured to change interpretation of the first signal to interpretation as the second signal when the signal is interpreted as the first signal on the basis of the discrimination information and to change interpretation of the second signal to interpretation as the first signal when the signal is interpreted as the second signal on the basis of the discrimination information, in a setting in which the second signal is to be modulated, wherein the controller controls the demodulation to continue or to stop on the basis of the interpretation changed by the changing unit.

(3) The signal processing device described in (1) or (2), wherein the first signal is a signal according to a DVB-T2 standard, and the second signal is a signal according to a DVB-NGH standard.

REFERENCE SIGNS LIST

10 Reception device, 11 Tuner, 12 BPF, 13 A/D converter, 14 Orthogonal demodulator, 15 P1 processor, 16 Frame synchronizer, 17 Symbol synchronizer, 18 FFT unit, 19 Equalizer, 20 Transmission path estimator, 21 Error correction unit, 100 Reception device, 101 Interpretation changing unit

The invention claimed is:

1. A signal processing device comprising:
   circuitry configured to
      detect a preamble signal from a multiplexed signal obtained by multiplexing a plurality of signals;
      demodulate a predetermined signal from the multiplexed signal;
      continue, in a first setting mode, demodulation by when discrimination information for discriminating each of the signals that is contained in the preamble signal indicates a first signal, and stop demodulation when the discrimination information indicates a second signal;
      change, in a second setting mode, interpretation of the first signal to interpretation as the second signal when the signal is interpreted as the first signal on the basis of the discrimination information and change interpretation of the second signal to interpretation as the first signal when the signal is interpreted as the second signal on the basis of the discrimination information, and control the demodulating to continue or to stop based on the changed interpretation.

2. The signal processing device according to claim 1, wherein the first signal is a signal according to a DVB-T2 standard, and the second signal is a signal according to a DVB-NGH standard.

3. A signal processing method comprising:
   detecting a preamble signal from a multiplexed signal obtained by multiplexing a plurality of signals;
   continuing, in a first setting mode, demodulation of a first signal when discrimination information for discriminating each of the signals that is contained in the detected preamble signal indicates the first signal, and stopping demodulation when the discrimination information indicates a second signal; and
   changing, in a second setting mode, interpretation of the first signal to interpretation as the second signal when the signal is interpreted as the first signal on the basis of the discrimination information and change interpretation of the second signal to interpretation as the first signal when the signal is interpreted as the second signal on the basis of the discrimination information, and control the demodulation to continue or to stop based of the changed interpretation.

4. A non-transitory computer-readable medium including computer program instructions, which when executed by an information processing device, causes the information processing device to execute processing comprising:
   detecting a preamble signal from a multiplexed signal obtained by multiplexing a plurality of signals;
   continuing, in a first setting mode, demodulation of a first signal when discrimination information for discriminating each of the signals that is contained in the detected preamble signal indicates the first signal, and stopping demodulation when the discrimination information indicates a second signal; and
   changing, in a second setting mode, interpretation of the first signal to interpretation as the second signal when the signal is interpreted as the first signal on the basis of the discrimination information and change interpretation of the second signal to interpretation as the first signal when the signal is interpreted as the second signal on the basis of the discrimination information, and control the demodulation to continue or to stop based of the changed interpretation.

* * * * *